Jan. 30, 1962     C. G. RAMBO     3,018,599
EDGER AND LAWN TRIMMER
Filed April 3, 1959     2 Sheets-Sheet 1
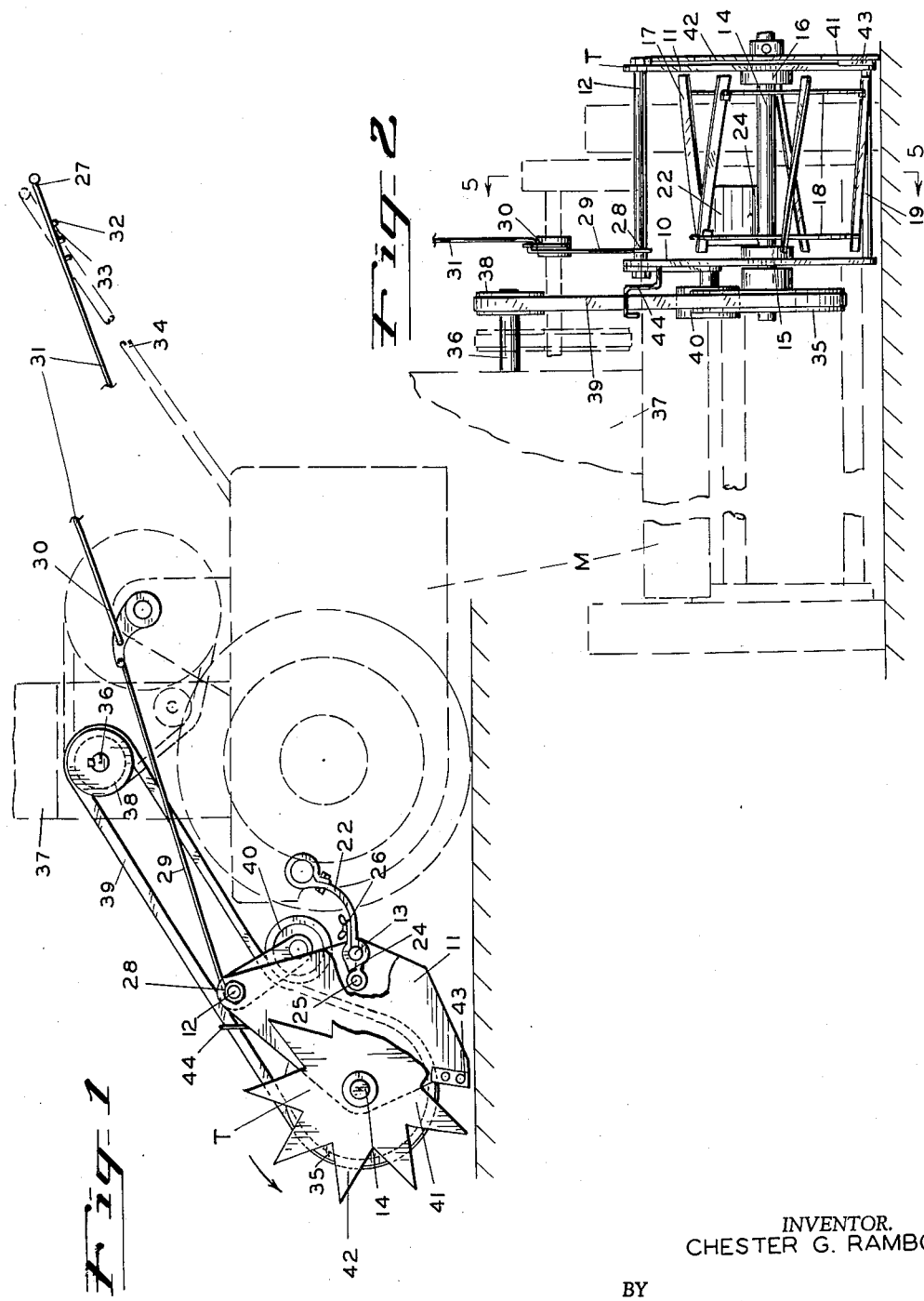
INVENTOR.
CHESTER G. RAMBO
BY
*Kimmel & Crowell*
ATTORNEYS Jan. 30, 1962 C. G. RAMBO 3,018,599
EDGER AND LAWN TRIMMER
Filed April 3, 1959 2 Sheets-Sheet 2
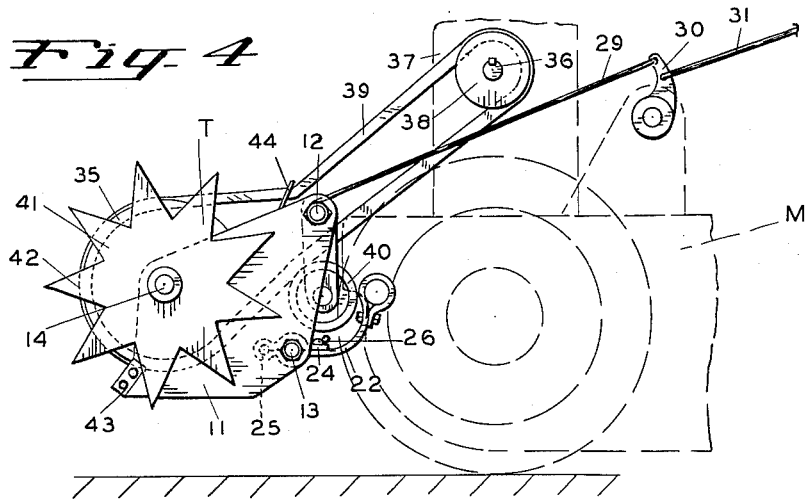
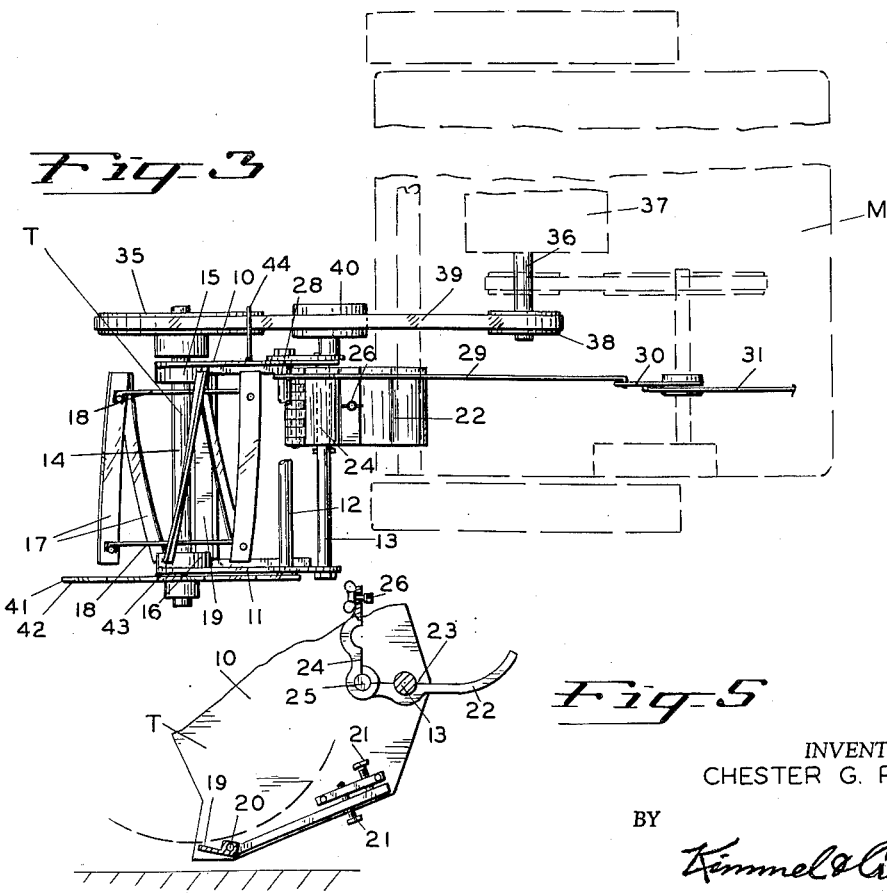
INVENTOR.
CHESTER G. RAMBO
BY
Kimmel & Crowell
ATTORNEYS 3,018,599
EDGER AND LAWN TRIMMER
Chester G. Rambo, 1334 NE. 53rd St., Portland, Oreg.
Filed Apr. 3, 1959, Ser. No. 803,980
3 Claims. (Cl. 56—26)

The present invention relates to improvements in edgers and lawn trimmers and particularly to such devices used as attachments to power lawn mowers of the rotating reel type.

The primary object of the invention is to provide a power operated edging and trimming attachment for a power lawn mower for trimming along the edge of side walks, flower beds and the like. In the carrying out of this object, the attachment is of a sufficient width to extend beyond the end of the lawn mower for trimming the edge of the lawn along side walks, flower beds and the like, allowing the wheel of the lawn mower to run on solid sod surface, but at the same time trimming beyond the edge of the lawn into flower beds and the like.

A still further object of the invention is to provide an edger and trimmer attachment that can be easily moved out of cutting position and can be easily disassembled from the lawn mower altogether.

Other objects and advantages will become apparent in the following specification when considered in light of the attached drawings, in which:

FIGURE 1 is a side view of the invention shown attached to a power lawn mower;

FIGURE 2 is a front elevation of the structure shown in FIGURE 1;

FIGURE 3 is a plan view of the structure shown in FIGURE 1;

FIGURE 4 is a view similar to FIGURE 1 with the edger and trimmer raised out of operating position; and FIGURE 5 is an enlarged fragmentary vertical sectional view taken on line 5—5 of FIGURE 2 looking in the direction of the arrows.

Referring now to the drawings in detail wherein like reference characters indicate like parts throughout the several figures, the reference character T indicates generally a lawn edger and trimmer attachment for a power lawn mower indicated generally at M.

The edger and trimmer T includes a pair of spaced apart parallel frames 10 and 11 connected by spacer rods 12, 13, a shaft 14 and a cutter bar 19. The shaft 14 is journalled within bearings 15 and 16 mounted on the plates 10 and 11 and has grass cutting blades 17 secured thereto by the spider members 18.

The cutter bar 19 is adjustably mounted between the frames 10 and 11 by a cap screw 20 and set screws 21, referring to FIGURE 5. A stationary bracket 22 is fixedly secured by suitable means to the frame of the lawn mower M and remains permanently thereon.

A groove 23 is formed on the upper surface of the bracket 22 to receive the spacer rod 13, as best illustrated in FIGURE 5. A cap 24 is hingedly secured to the bracket 22 at 25 and is arranged to embrace the bar 13, holding the same to the bracket 22 when locked thereto by the set screw 26, sufficient clearance being allowed to permit the rod 13 to revolve therein.

The edger and trimmer T is raised or lowered by an operating handle 27. An end 28 of a rod 29 is pivotally connected to the frame 10 and extends to a lever 30 to which it also is pivotally connected. The lever 30 is pivotally mounted on the lawn mower M and is connected to the operating handle 27 by the rod 31.

Pins 32 form part of the rod 31 adjacent the handle 27 and engage the dog 33 forming part of the handle 34 of the lawn mower M. If the operator pulls the lever 27 towards him, he will raise the trimmer assembly T to the position shown in FIGURE 4, and on disconnecting the pins 32 from the dog 33 the trimmer assembly T will be lowered to the position shown in FIGURES 1 and 2.

A grooved pulley 35 is keyed to the shaft 14 and is driven from the shaft 36 coming from the engine 37 of the lawn mower M by an additional sheave 38 and belt 39. An idler roller 40 can be adjusted to tighten the belt 39 to the desired tightness.

Fixedly secured to the outer end of the shaft 14 is a trimmer blade 41. The blade 41 has a series of teeth 42 arranged to engage with a shear action a vertically disposed cutter blade 43 mounted on the outer frame 11 of the edger and trimmer T, as best illustrated in FIGURE 1. The trimmer blade 41 and cutter blade 43 are adapted to trim the edge of the lawn along side walks, flower beds and the like when driven by the lawn mower M.

As stated before, when it is desired to move the edging and trimming attachment T out of the way when not in use, the handle 27 is pulled and one of the pins 32 drops over the dog 33 forming part of the handle 34 of the lawn mower M so as to hold the trimming unit T in raised position, as illustrated in FIGURE 4. Referring to FIGURE 5, the edging and trimming unit T can be removed by loosening the set screw 26 and hinging the cap 24 out of the way, lifting the operating rod 13 out of the groove 23 of the bracket 22, permitting the removal of the edging and trimming unit T after disconnecting the rod 29 from the lever 30.

The belt 39 is prevented from coming off the sheaves 35 and 38 when the edger is in raised position, as illustrated in FIGURE 4, by a guiding finger 44 which forms part of the trimming device T, as best illustrated in FIGURES 2 and 3.

Having thus described the preferred embodiment of the invention, it should be understood that numerous structural modifications and adaptations may be resorted to without departing from the scope of the appended claims.

What is claimed is:

1. An edger and trimmer attachment for lawn mowers of the type including a power drive unit comprising a pair of frame plates, a pair of spacer rods rigidly securing said plates in spaced parallel relation, means extending rearwardly from one of said rods for detachably and pivotally securing said plates to the power lawn mower, a horizontal cutter bar secured at its opposite ends to the lower portions of said plates, a horizontal shaft journalled in said plates overlying said horizontal cutter bar, a plurality of cutter blades fixedly secured to said shaft and arranged for shearing cooperation with said cutter bar on rotary movement of said shaft, an upright cutter bar rigidly secured to the outermost of said frames, a toothed cutter disk fixedly secured to said shaft and arranged for cooperative shearing contact with said upright cutter blade upon rotary movement of said shaft, and means for driving said shaft from said power drive unit comprising a pulley on said shaft and a belt for connecting said pulley to said power drive unit, and an adjustable tension roller mounted on one of said frame plates for engaging said belt and maintaining said belt in taut condition.

2. A device as claimed in claim 1 wherein a remote control unit is provided for mounting on said lawn mower for pivoting said attachment into and out of operative position with respect to the ground.

3. A device as claimed in claim 1 wherein guide means rigidly mounted on one of said frame plates engages opposite sides of said belt maintaining said belt in contact with said pulley.

References Cited in the file of this patent

UNITED STATES PATENTS

| | | |
|---|---|---|
| 2,039,029 | Pond | Apr. 28, 1936 |
| 2,603,931 | Pivert | July 22, 1952 |
| 2,622,384 | Velotta | Dec. 23, 1952 |
| 2,719,398 | Hutchens | Oct. 4, 1955 |
| 2,771,730 | True | Nov. 27, 1956 |
| 2,909,021 | McLane | Oct. 20, 1959 |

FOREIGN PATENTS

| | | |
|---|---|---|
| 255,016 | Switzerland | Jan. 3, 1949 |